DIVERSITY RECEPTION EMPLOYING FREQUENCY SHIFT KEYING

Filed March 24, 1948

INVENTOR.
STEPHEN YANDO

BY

R P Morris
ATTORNEY

Patented Aug. 29, 1950 2,520,188

UNITED STATES PATENT OFFICE 2,520,188

DIVERSITY RECEPTION EMPLOYING FREQUENCY SHIFT KEYING

Stephen Yando, Mineola, N. Y., assignor to Mackay Radio and Telegraph Company, New York, N. Y., a corporation of Delaware Application March 24, 1948, Serial No. 16,718

8 Claims. (Cl. 250—20)

This invention relates to diversity reception of carrier shift signals and more particularly to a method and means for overcoming the detrimental effects of selective fading of frequency modulated signals on diversity antennae.

Diversity systems for receiving signals at a plurality of points have been used in the prior art to overcome the troublesome effect of fading since it had been observed that at any instant, signals received at one antenna may be of maximum intensity while signals received at the other antenna may be of minimum intensity. These signals were combined in an effort to obtain continuous reception. However, it was subsequently discovered that these signals were found to assume random phase and amplitude and a direct combination of audio signals became impossible because of attendant cancellation at the time when received signals were of equal amplitude and out of phase. This resulted in a loss of signal strength due to cancellation of the fundamental signals.

It is an object of the present invention to provide a system which will overcome the detrimental effect of selective fading.

Another object of this invention is to provide diversity receiving means wherein second harmonics of the input signals are intentionally generated and utilized to overcome the effect of selective fading caused by cancellation of the fundamental signals.

A still further object of the invention is to derive the second harmonic components of frequency modulated signals received at a plurality of antennae, and add these harmonics to their fundamentals in such a manner that a substantially constant output will be produced irrespective of the phase cancellation of the fundamental signals received at the plurality of points.

According to the invention means are provided for receiving the signals at a plurality of separate points, generating, at each of said points, the even harmonics of said received signals, combining the fundamental and said even harmonic components, filtering said combined signals to reject all signals above the second harmonic thereof, detecting said filtered signals and deriving an output signal substantially unaffected by relative differences in phase and magnitude of said received signals.

Figure 1:
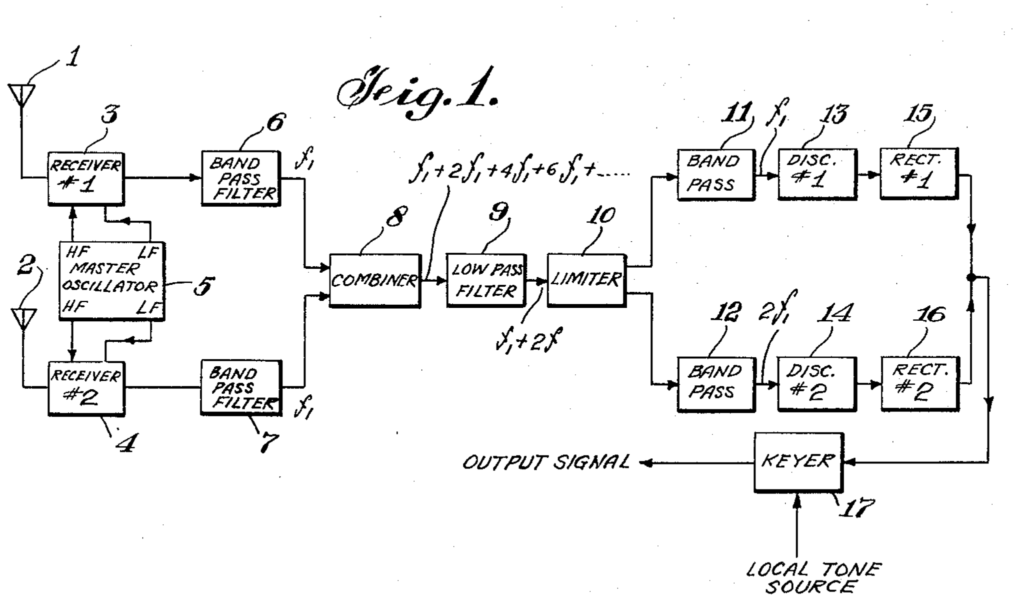
Figure 2:
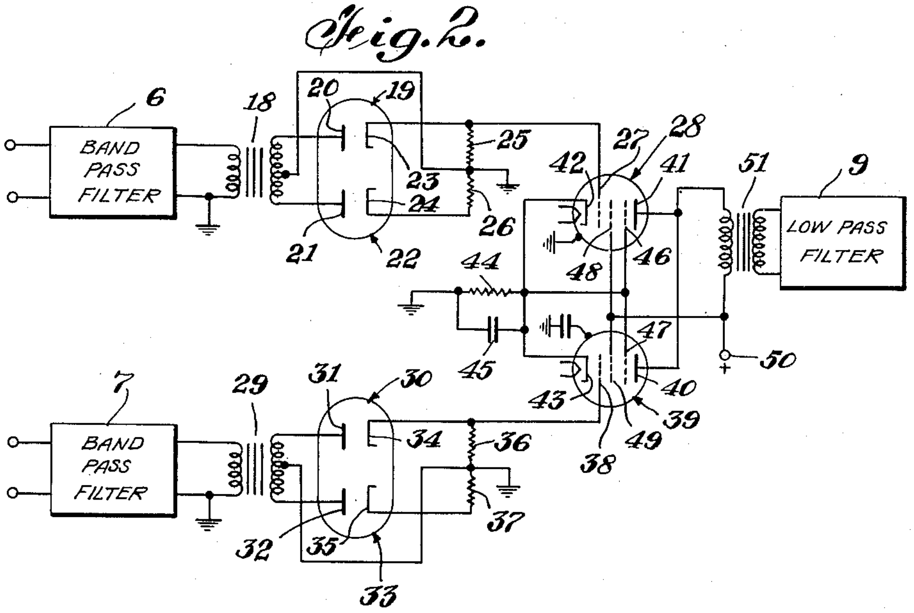

A better understanding of the invention and its objects and features may be attained by reading tthe following description in conjunction with the accompanying drawings wherein:

Fig. 1 is a block diagram of a diversity reception system employing the principles of this invention, and Fig. 2 is a schematic diagram illustrating the details of a portion of Fig. 1.

Referring now to the block diagram of Fig. 1, two identical independent carrier shift signals are induced in diversity antennae 1 and 2 located at a plurality of separate points and are fed through receivers 3 and 4 respectively. These receivers are supplied with both high frequency and low frequency heterodyning oscillations from a common crystal controlled master oscillator 5. The signals are then detected at the receivers and passed into band pass filters 6 and 7 respectively where noise and interfering signals outside the frequency band of the desired intelligence are rejected. Signals occupying a frequency band $f_1$ are then passed to separate inputs of combiner 8.

By way of example, let us assume that band $f_1$ comprises frequencies between 2000 and 3000 cycles, and that this band thus has a center frequency of 2500 cycles. As hereinbefore pointed out, since the received signals both independently assume random phase and amplitude, the direct combination of audio signals is impossible because of the attendant cancellation at a time when the received signals are of equal amplitude and out of phase. To avoid loss of signal strength due to cancellation I purposely generate in combiner 8, (details of which are shown more specifically in Fig. 2) the even harmonics of the fundamental frequency signal obtained from each receiver and then combine these harmonics together with the fundamentals so that when the phase displacement of the signals is such as to cause cancellation of the fundamental signal, the derived second harmonic components do not cancel, but will reinforce one another, and vice versa. Since second harmonic components are derived from the fundamental signals they are as fully authentic as the original signal. In this manner, either or both the fundamental and the second harmonic of the signal as well as combinations of the higher order even harmonics will be present at the combiner output as long as either receiver is putting out a signal. Thus, my purpose of getting a continuous signal of the best available signal-to-noise ratio from two independently fading signals is accomplished.

At the output of the combiner 8, a low pass filter 9 is inserted to reject all harmonics above the second harmonic because their purpose is nil. A limiter 10 then accepts the combined signal composed of the fundamental and second harmonic components from the output of low pass filter 9, amplifies and limits the combined signal, and produces an output which is constant for a wide range of inputs. The limiter output then separates the fundamental from the second harmonic components by means of band pass filters 11 and 12 respectively. Thus filter 11 passes the fundamental frequency and filter 12 passes the second harmonic, and means are provided whereby each of these filters may be adjusted to provide the same average output for both the signals in the 2000 to 3000 cycle band and the signals in the 4000 to 6000 cycle band. Signals from each of the filters 11 and 12 are fed to respective discriminators 13 and 14 wherein the frequency modulated signals are converted to amplitude modulated signals. These signals are then rectified by rectifiers 15 and 16 respectively and the D. C. output from the rectifiers are added and utilized to turn on and off a local tone source by means of keyer 17. The resulting output signal is then transmitted through conventional channels, for example to a city office.

The details of the combiner wherein the even harmonics are generated and combined with the received fundamental frequencies are shown in Fig. 2 wherein corresponding parts of Fig. 1 are designated by the same reference numerals. The signal output from the receiver 3 is passed through band pass filter 6 which as stated above, rejects noise outside the frequency band of the intelligence. In the example chosen to illustrate applicant's invention band pass filter 6 has a center frequency of 2500 cycles and the signal intelligence then appears at the output of filter 6 in a frequency band which is substantially 1000 cycles wide, that is, from 2000 to 3000 cycles. The signal is then passed through a transformer 18 to a half wave rectifier 19 for the express purpose of producing even harmonics of the signal frequency.

According to a preferred embodiment, the terminals of the secondary of transformer 18 are connected respectively to anodes 20 and 21 of diodes 19 and 22. Cathodes 23 and 24 respectively of diodes 19 and 22 are connected together through resistors 25 and 26, the junction point of which resistors is connected to the midpoint of the transformer secondary and to ground. By virtue of half wave rectification, the frequency bands of the intelligence are greatly multiplied and across resistor 25 there will appear, intelligence in the bands of 2000 to 3000 cycles, 4000 to 6000 cycles . . . and so forth. The half wave rectified signals are then impressed on the grid 27 of pentode amplifier 28.

A similar operation takes place with respect to the signals from receiver 4 which are passed through the band pass filter 7 which, in the case of the present example, has a center frequency of 2500 cycles. The signals from the output of filter 7 are then passed to transformer 29. The ends of the secondary winding of transformer 29 are connected respectively to the anode 31 of diode 30, and to the anode 32 of diode 33. Likewise, cathodes 34 and 35 respectively of diode 30 and 33 are serially connected by resistors 36 and 37, their junction point being connected to the midpoint of the secondary winding of transformer 29 and to ground.

Diodes 22 and 33 are employed to prevent direct current saturation of the input transformers 18 and 29 respectively.

By virtue of half wave rectification, intelligence signals will appear in the output of diode 30 across resistor 36, in the bands of 2000 to 3000 cycles, 4000 to 6000 cycles, . . . and so forth. The half wave rectified signals appearing across resistor 36 are then impressed on grid 38 of the pentode amplifier 39 whose anode 40 is connected in parallel with the anode 41 of amplifier 28. The respective cathodes 42 and 43 of amplifiers 28 and 40 are also tied together and to ground through a resistor 44 and by-passed by a condenser 45. The suppressor grids 46 and 47 of tubes 28 and 40 are tied together and to the cathodes. The screen grids 48 and 49 from tubes 28 and 39 are also connected together and to a positive source of potential 50. Anodes 40 and 41 are connected to the same source of positive potential 50 through the primary winding of transformer 51 wherein will appear a direct addition of the signals appearing across resistors 25 and 36.

As explained above, when the relative phasing and magnitude of the input signals from the receiver is such as to cause cancellation of the signals in the 2000 to 3000 cycle band, reinforcement of the signals in the 4000 to 6000 cycle band will occur and vice versa. The secondary winding of transformer 51 is connected to the input of low pass filter 9 wherein the signals are further treated as explained with reference to Fig. 1.

It will be seen therefore that the output of the combiner circuit accomplishes the desired result, that is, provides a composite signal of optimum signal to noise ratio irregardless of selective phasing and relative phase and magnitude of the received signals.

Although the principles of the invention have been disclosed in connection with a preferred embodiment it is to be clearly understood that the above description serves only as an example and is not intended to define the scope of the invention.

I claim:

1. A diversity reception system for reducing selective fading of frequency modulated radio signals comprising means for receiving signals at a plurality of separate points, means for generating the even harmonics of each of said received signals, means for combining the fundamental and said harmonics of said separately received signals, means for filtering said combined signals so as to produce the fundamental and second harmonic thereof, means for detecting said signals of fundamental frequency and said signals of second harmonic frequency, and means for adding said detected signals together to obtain a composite output signal substantially unaffected by relative differences in phase and magnitude of said received signals.

2. A system in accordance with claim 1 further comprising means for limiting said filtered signals.

3. A system in accordance with claim 2 wherein the output from said limiting means is connected to two band pass filters to separate the fundamental from the second harmonic signal.

4. A system in accordance with claim 3 wherein said detecting means further comprises a first discriminator and a second discriminator, each of said discriminators being connected between said adding means and one of said band pass filters.

5. A system in accordance with claim 1 wherein each of said receiving means is capable of producing audio carrier shift signals, further comprising band pass filters connected to the output of each of said receiving means for rejecting noise and interfering signals outside of the frequency band of the desired intelligence.

6. A system in accordance with claim 5 further comprising rectifiers for generating said harmonics.

7. A system in accordance with claim 6 wherein said combining means further comprises one or more electron discharge tubes for directly adding the fundamental and even harmonic signals from each receiver.

8. A system in accordance with claim 7 comprising a plurality of pentode amplifier tubes each having a grid upon which to impress the output of said rectifiers, and an anode, said anodes being connected in parallel.

STEPHEN YANDO.

REFERENCES CITED

The following references are of record in the file of this patent:

UNITED STATES PATENTS

| Number | Name | Date |
|---|---|---|
| 2,257,282 | Smith | Sept. 30, 1941 |
| 2,269,594 | Mathes | Jan. 13, 1942 |
| 2,277,261 | Smith | Mar. 24, 1942 |
| 2,306,687 | Cox | Dec. 29, 1942 |
| 2,397,830 | Bailey | Apr. 2, 1946 |